United States Patent Office 3,332,954
Patented July 25, 1967

3,332,954
N-OLEOYL-1,2,3,4-TETRAHYDROQUINOLINE
Evald L. Skau, Robert R. Mod, and Frank C. Magne, New Orleans, La., assignors to the United States of America as represented by the Secretary of Agriculture
No Drawing. Application Apr. 2, 1964, Ser. No. 361,925, now Patent No. 3,248,396, dated Apr. 26, 1966, which is a division of application Ser. No. 260,923, Feb. 25, 1963, now Patent No. 3,219,612, dated Nov. 23, 1965. Divided and this application Sept. 10, 1965, Ser. No. 509,449
1 Claim. (Cl. 260—287)

This application is a division of Ser. No. 361,925, filed Apr. 2, 1964, now Patent No. 3,248,396, which is a division of Ser. No. 260,923, filed Feb. 25, 1963, now Patent No. 3,219,612.

A non-exclusive, irrevocable, royalty-free license in the invention herein described, throughout the world for all purposes of the United States Government, with the power to grant sublicenses for such purposes, is hereby granted to the Government of the United States of America.

This invention relates to certain compounds which are N-acyl derivatives of cyclic imines and to plastic compositions, the plasticizer component of which is at least one of the compounds that are the subject of this invention. More particularly, the invention claimed in this application relates to N-oleoyl-1,2,3,4-tetrahydroquinoline.

We have discovered that the compound which is the subject of this invention is a good, compatible, solvent-type plasticizer for vinyl chloride resins. Moreover, the compound is an efficient primary solvent-type plasticizer which can be made from low price materials and which exhibits good compatibility with and imparts low volatility loss, resistance to microbial action, excellent low temperature properties, and stability to northern light exposure to polymer and copolymer resins of vinly chloride.

The terms "vinyl type resin" and "vinyl chloride resin" are used in this specification to refer to polymers and copolymers of monomers containing vinyl chloride in a predominant proportion by weight. Terms such as "compatible," "good compatibility," and compatible plasticizers" in reference to the plasticizer used to refer to a plasticizer that shows no sign of exudation, migration to the surface, for at least two weeks when present in the resin in proportions of about 70 parts by weight of plasticizer to 100 parts by weight of resin.

If a resin is plasticized with a compound with which it has only limited compatibility, the plasticizer soon exudes or migrates to the surface unless the plasticizer is used either in a limited amount or is used in conjunction with a mutual solvent (a compatible auxiliary plasticizer) to obtain adequate compatibility.

It is known in the art that compounds similar to that which is the subject of this invention exhibit reasonably good compatibility for hydrophylic type resins but in order to obtain adequate flexibility must be employed together with a secondary or an auxiliary plasticizer. See for example United States Patent Number 2,339,056.

It would be expected from the recognized compatibility of compounds related to the type herein described with polyvinyl acetals (hydrophylic type resins), that N-oleoyl-1,2,3,4-tetrahydroquinoline would be quite incompatible with polymers of the vinyl chloride type. We have discovered, however, that not only is the particular compound compatible as a primary plasticizer with vinyl chloride resins, but is compatible with the hydrophylic type resins as well.

The compounds of the instant invention were tested for vinyl chloride-vinyl acetate (95–5) copolymer resin Vinylite (VYDR) and in polyvinylchloride (Geon 101) in a standard formulation comprising 63.5% of Vinylite VYDR or Geon 101, 35% plasticizer, 0.5% stearic acid, and 1.0% basic lead carbonate. This formulation for each sample was milled, molded, and tested. In all examples, the sample was rated as incompatible if the molded stock showed any evidence of exudation or migration to the surface during a shelf storage of two weeks.

The compound that is the subject of this invention is conveniently prepared by reacting 1,2,3,4-tetrahydroquinoline with the appropriate acid or corresponding acid chloride. In any event, methods for preparing amides are well known to those skilled in the art of fatty acid chemistry. The details of individual preparations are listed in the operating examples which follow, in which Example 1 is included to show the general operating procedure by which the amides can be prepared.

*Example 1*

N-Oleoylpiperidine.—Twenty-two and four tenths grams (0.26 mole) of piperidine were dissolved in 60 milliliters of benzene and 39.7 grams (0.13 mole) of oleoyl chloride were added dropwise with stirring. After stirring for an additional hour, the reaction mixture was filtered, washed successively with dilute hydrochloric acid and water, and dried over anhydrous sodium sulfate. Free acid was removed by percolating the benzene solution through a column of activated alumina and eluting the amide with a 1:1 ethanol-benzene mixture. The solvent was then removed by stripping under reduced pressure. Analysis of the product, N-oleoylpiperidine: percent C, 78.15 (theory 78.95); percent H, 12.07 (theory 12.40); percent N, 4.04 (theory 4.04).

*Example 2*

N - Oleoyl - 1,2,3,4 - tetrahydroquinoline.—N-oleoyl-1,2,3,4-tetrahydroquinoline was prepared from 15 grams (0.11 mole) of 1,2,3,4-tetrahydroquinoline, 35 grams (0.11 mole) of oleoyl chloride, and 9.2 grams (0.11 mole) of pyridine by the procedure of Example 1, except that the free unreacted acid was removed by washing with 4 percent alcoholic KOH followed by water washings. Analysis of the product N-oleoyl-1,2,3,4-tetrahydroquinoline: percent C, 80.89 (theory 81.48); percent H, 10.91 (theory 10.81); percent N, 3.31 (theory 3.52)

A sample of the product of Example 2 was evaluated as plasticizer for Vinylite VYDR resin, using the aforementioned formulations. Di-2-ethylhexylphthalate (DOP) was used as control. The results are shown in Table I, below.

TABLE I

| Ex. No. | Plasticizer | Tensile strength, p.s.i. | 100% modulus, p.s.i. | Elongation, Percent | Brittle point, °C. | Volatility loss, Percent | Compatibility [1] |
|---|---|---|---|---|---|---|---|
| 2 | N-oleoyl-1,2,3,4-tetrahydroquinoline | 2,990 | 1,470 | 350 | −30 | | C |
| | Di-2-ethylhexylphthalate (control) | 3,050 | 1,600 | 330 | −33 | 1.99 | C |

[1] C=Compatible.

Improved light stability and thermal stability can be attained by inclusion of suitable stabilizers and/or antioxidants in the resin-plasticizer formulation.

The soapy water extractability can be reduced by the use of additives such as hydrocarbon extenders.

We claim:

N-oleoyl-1,2,3,4-tetrahydroquinoline.

References Cited

UNITED STATES PATENTS 2,058,013  10/1936  Henke et al. _____ 260—294
2,166,118  7/1939   Bousquet _____ 167—33
3,223,708  12/1965  Mod et al. _____ 260—287

FOREIGN PATENTS 327,724  7/1935  Italy.

OTHER REFERENCES

Zolotarev et al.: Chem. Abstracts, vol. 53, col. 20675 (1959).

ALEX MAZEL, *Primary Examiner.*

DONALD G. DAUS, *Assistant Examiner.*